(12) United States Patent
Li

(10) Patent No.: US 10,975,482 B1
(45) Date of Patent: Apr. 13, 2021

(54) SELF-DERIVATIVE IRON-CONTAINING NICKEL ANODE FOR WATER ELECTROLYSIS

(71) Applicant: Haiming Li, Stoughton, MA (US)

(72) Inventor: Haiming Li, Stoughton, MA (US)

( * ) Notice: Subject to any disclaimer, the term of this patent is extended or adjusted under 35 U.S.C. 154(b) by 0 days.

(21) Appl. No.: 16/803,934

(22) Filed: Feb. 27, 2020

(51) Int. Cl.
| | |
|---|---|
| *C25B 11/091* | (2021.01) |
| *C25B 11/03* | (2021.01) |
| *C25B 1/04* | (2021.01) |
| *C25B 11/051* | (2021.01) |
| *C25B 11/057* | (2021.01) |
| *C25D 11/02* | (2006.01) |
| *C25D 5/48* | (2006.01) |
| *C25D 11/20* | (2006.01) |

(52) U.S. Cl.
CPC ............ *C25B 11/091* (2021.01); *C25B 1/04* (2013.01); *C25B 11/03* (2013.01); *C25B 11/051* (2021.01); *C25B 11/057* (2021.01); *C25D 5/48* (2013.01); *C25D 11/024* (2013.01); *C25D 11/20* (2013.01)

(58) Field of Classification Search
CPC ....... C25B 1/04; C25B 11/03; C25B 11/0478; C25B 11/0405; C25B 11/0415; C25D 3/20; C25D 11/024
See application file for complete search history.

(56) References Cited

U.S. PATENT DOCUMENTS

| | | | | |
|---|---|---|---|---|
| 3,279,957 A | * | 10/1966 | Fink .................. | C23C 22/62 148/243 |
| 4,292,159 A | * | 9/1981 | Kuo ................... | C25B 11/0442 204/237 |
| 4,670,122 A | * | 6/1987 | Mathur ............... | C25B 11/0478 204/252 |
| 2014/0057383 A1 | * | 2/2014 | Okuuchi ........... | H01L 31/02363 438/71 |
| 2017/0197015 A1 | * | 7/2017 | Desai ................. | A61L 31/146 |
| 2019/0119822 A1 | * | 4/2019 | Fontecave .......... | H01M 4/8853 |
| 2019/0256992 A1 | * | 8/2019 | Hu ..................... | C25B 11/035 |

FOREIGN PATENT DOCUMENTS

| | | | | |
|---|---|---|---|---|
| CN | 109837556 A | * | 6/2019 | |
| CN | 109972158 A | * | 7/2019 | |

OTHER PUBLICATIONS

Machine translation of CN109837556A. (Year: 2019).*
Machine translation of CN109972158A. (Year: 2019).*

\* cited by examiner

*Primary Examiner* — Brian W Cohen

(57) ABSTRACT

The invention discloses a self-derivative iron-containing nickel anode for alkaline water electrolysis and its preparation method. The anode comprises a nickel substrate and catalytic material layer. The catalytic layer is disposed on and integrated with the surface of the nickel substrate. The catalytic layer contains nickel oxide with iron components. The nickel oxide results from the reaction of the surface layer of the nickel substrate with an oxidant-rich alkaline solution and forms a nanosheet array layer. A nickel-oxidation state containing the iron component is formed by electrochemically induced iron-ion corrosion of the nickel-oxidation state. The invention can effectively reduce the potential difference between the anode and cathode of an electrolysis cell, thereby significantly reduces energy consumption and improves the efficiency of water electrolysis.

4 Claims, 6 Drawing Sheets

FIG. 1A
FIG. 1B
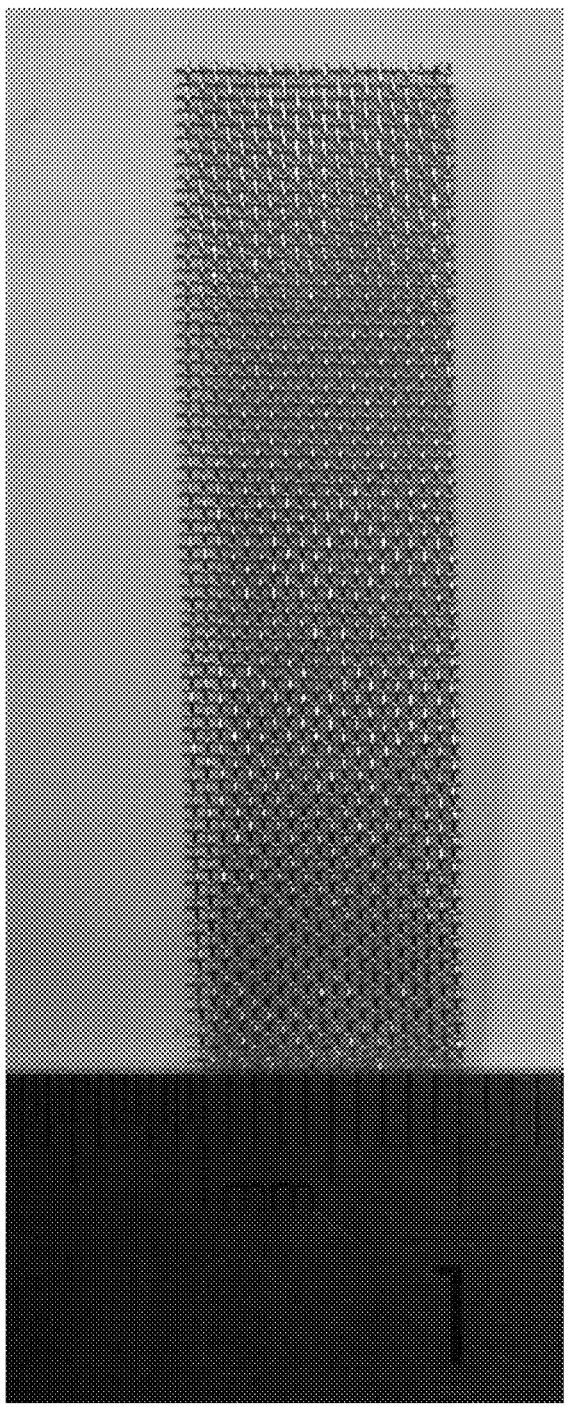
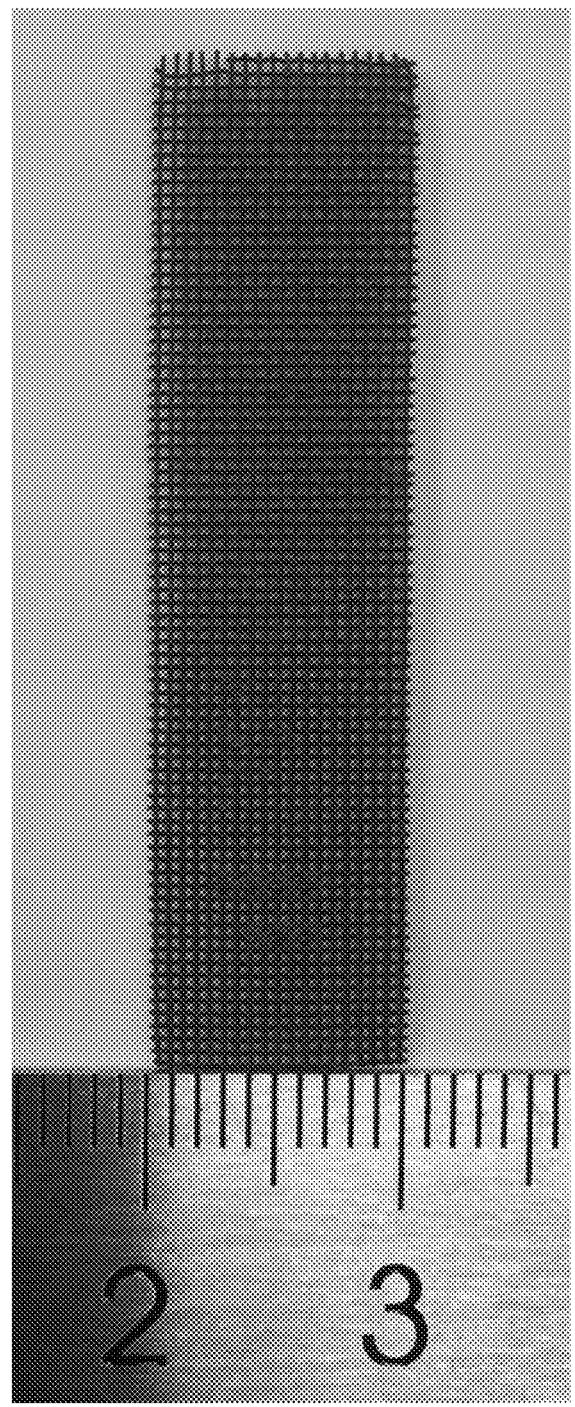

SELF-DERIVATIVE IRON-CONTAINING NICKEL ANODE FOR WATER ELECTROLYSIS

TECHNICAL FIELD

The invention relates to a water electrolysis anode and a method for its preparation.

BACKGROUND OF INVENTION

Water electrolysis involves hydrogen evolution at a cathode coupled with oxygen evolution at an associated anode. Hydrogen is a relatively high-value target product with widely industrial and community applications. The overpotentials of hydrogen evolution and oxygen evolution are the key factors that determine the cell voltage between the anode and cathode. Comparing the electrolysis process at anode and cathode electrodes, it is found that the fact of the slow kinetics of anodic oxygen evolution that due to the high activation energy bather of the oxygen-oxygen bond indicates that oxygen evolution is the limiting step of the hydrogen production process. Therefore, the development of a water electrolysis anode with high efficiency of oxygen-evolution electrocatalytic activity has great significance for hydrogen production by water electrolysis.

Conventional anodes for alkaline water electrolysis are usually made of nickel-based materials, including nickel meshes, nickel foam, porous nickel plates/sheets, etc. In the process of water electrolysis, the nickel forms a nickel oxide/hydroxide layer on the surface due to anodic polarization. This layer is an electrocatalytically active layer for the oxygen-evolution reaction. However, nickel oxide or hydroxide is a catalyst with low catalytic activity of oxygen evolution. Thus, there is a need for improvements over conventional anodes for alkaline water electrolysis.

Iron has a significant effect on promoting the oxygen-evolution electrocatalytic activity of the nickel compound. Currently, nickel-iron composite compounds including nickel iron oxide, nickel iron hydroxide, nickel iron phosphide, nickel iron sulfide, nickel iron nitride, etc. are anodic catalysts with good oxygen-evolution electrocatalytic performance. Hence, the introduction of nickel-iron composite compounds into the anode for water electrolysis can effectively improve the oxygen-evolution electrocatalytic activity of the anode. It can promote the overall reaction of water electrolysis and reduce the cell voltage of electrolytic cell.

Traditional preparation methods for creating a catalyst layer on the electrode surface include electroplating, hydrothermal growth, vapor deposition, mechanical brush coating, magnetron sputtering, etc. The electrode obtained by these methods has a distinct phase interface between the substrate and catalytic layer, which are bonded together by mechanical adhesion and easily detach during long-term use, resulting in a decrease in catalytic performance and lifetime.

SUMMARY

Disclosed herein is a self-derivative iron-containing nickel anode for water electrolysis that includes an integrally formed catalytic layer containing nickel oxide with an iron component. This anode reduces the cell voltage of the electrolytic cell, compared with cells employing conventional nickel anodes, and avoids catalytic-layer detachment, thus solving the above-mentioned problems.

The anode includes a nickel substrate, e.g., in the form of a nickel plate, nickel mesh, or nickel foam, which is oxidized to form a nickel-oxide nanosheet array on the substrate surface. The nickel-oxide nanosheet array may comprise one or more of nickel oxides, nickel hydroxide, or nickel oxyhydroxide. Iron is incorporated into the nickel-oxide nanosheet array by electrochemically inducing corrosion in a ferrous solution, resulting in iron-containing nickel oxide, iron-containing nickel hydroxide, or iron-containing nickel oxyhydroxide.

The self-derivative iron-containing nickel anode can be prepared by a process comprising the following steps:
Step 1: Clean the nickel substrate;
Step 2: The cleaned nickel substrate is exposed, at a constant temperature, in an oxidant-rich alkaline solution to obtain, at a surface of the substrate, a self-derived nickel-oxide nanosheet array layer;
Step 3: The substrate with nickel-oxide nanosheet array layer is electrochemically induced iron ion to corrode the nickel-oxide nanosheet array layer to obtain an iron-containing nickel-oxide nanosheet array on the surface of the substrate.

Further details of step 1 are ultrasonically cleaning the nickel substrate in acetone solution for 10 to 30 minutes and washing with ethanol to remove a grease layer from the nickel surface. For removing an oxide layer from the substrate surface, placing the substrate in hydrochloric acid solution with the concentration of 1-6 moles per liter, ultrasonically clean for 5-25 minutes; then standing in the hydrochloric acid solution for 10-30 minutes. Thereafter, wash the substrate with distilled water repeatedly.

Further details of step 2 are treating the substrate in the oxygen-rich alkaline solution in a sealed environment at a temperature of 40 to 200° C. for 2 to 10 hours, the oxygen-rich alkaline comprises 100 to 600 microliter of oxidant aqueous solution with a mass fraction of 30%, which is comprised at least one or more of, potassium permanganate, sodium permanganate, potassium hypochlorite, sodium hypochlorite, potassium chlorate, sodium chlorate, potassium perchlorate, or sodium perchlorate, added to one liter of sodium hydroxide solution under the concentration of 0.01 to 6 moles per liter.

Further details of step 3 are electrochemically inducing iron ion to corrode the nickel-oxide nanosheet array layer comprises performing electrolysis in a mixed solution of 0.5 to 20 mmole per liter of ferrous iron, comprises at least one or more of ferrous sulfate ammonium ferrous sulfate, potassium ferricyanide, ferrous acetate, or ferrocene, and 0.2 to 1 mole per liter of sodium citrate, using the nickel substrate with the self-derived nickel-oxide nanosheet array layer as an anode and using a nickel plate as a cathode by using pulsed current polarization to intermittently treat (single-pulse current time of about 10 seconds and pulse interval time of 10 seconds to achieve electrochemical inducement of ferrous ion oxidation to iron ions) for 2 to 12 hours under a pulse current density of 10 to 50 mA/cm2. Thereafter washing and drying the treated substrate with distilled water.

Compared with the existing technology, the iron-containing nickel anode and its preparation method described herein provide various advantages and effects: the invention provides a solution of obtaining a high-performance anode for alkaline water electrolysis. The nickel substrate is treated by oxidation reaction and electrochemical induced corrosion reaction. In the oxidation reaction, the surface layer of nickel substrate is reacted into nickel oxidation. This in-situ conversion strategy eliminates the strict phase interface between the substrate and the catalytic layer and improves the electron transfer. It helps to increase the overall conductivity of the electrodes, as well as strengthens the mechanical adhesion between the catalytic layer and the nickel substrate. Thereafter helps to increase the physical stability of the electrode during the catalytic process. Under electrochemical induced correction reaction, the ferrous ions are oxidized to iron ions which corrode the nickel-oxide nanosheet array layer to form an iron-containing nickel-oxide nanosheet catalytic layer with high oxygen-evolution activity. Replacing traditional pure nickel anodes with anodes in accordance with various embodiments, which include an iron-doped nickel-oxide catalytic layer, can effectively reduce the electrical potential of the anode during water electrolysis, and thereby the energy consumption of water electrolysis, which improves efficiency. In addition, the preparation method is simple, and benefits from comparatively low raw-material consumption and low energy consumption. Conveniently, the process can be performed at atmospheric pressure, and it is easy to scale up for increased production.

BRIEF DESCRIPTION OF THE FIGURES

FIG. 1A and FIG. 1B show an untreated nickel mesh and a self-derivative iron-containing nickel-oxide anode in accordance with various embodiments, respectively.

DETAILED DESCRIPTION OF EXAMPLE EMBODIMENTS

Further details of various embodiments of the invention are given below by way of example. The scope of the invention is not limited to these examples. The examples provide preparation methods and performance tests of water electrolysis anodes based on nickel mesh substrate between disclosed invitation and comparative traditional pure nickel anode.

Figure 2:
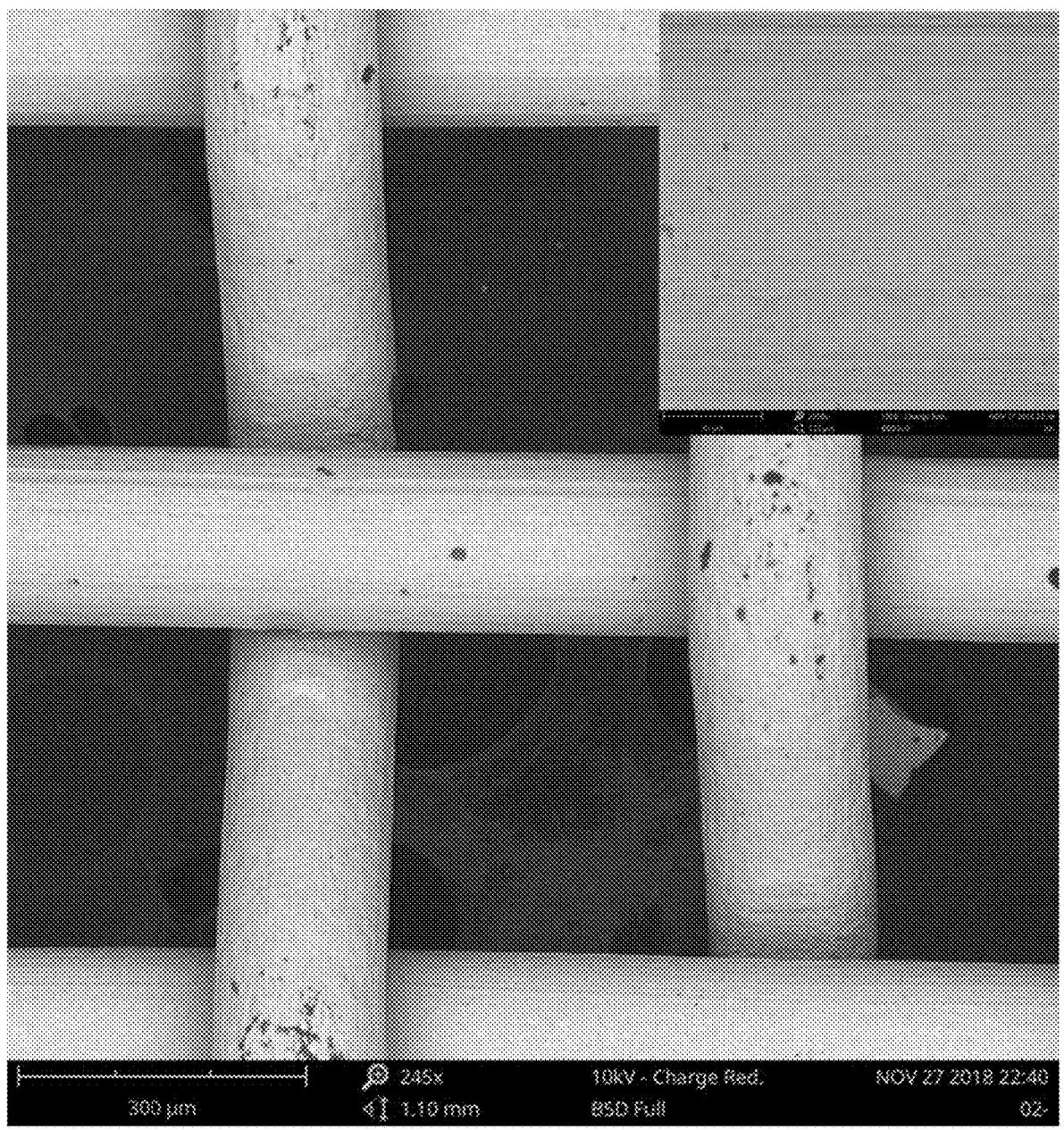
FIG. 2 is a scanning electron microscope (SEM) image of the surface of the nickel mesh of FIG. 1A.
Figure 6:
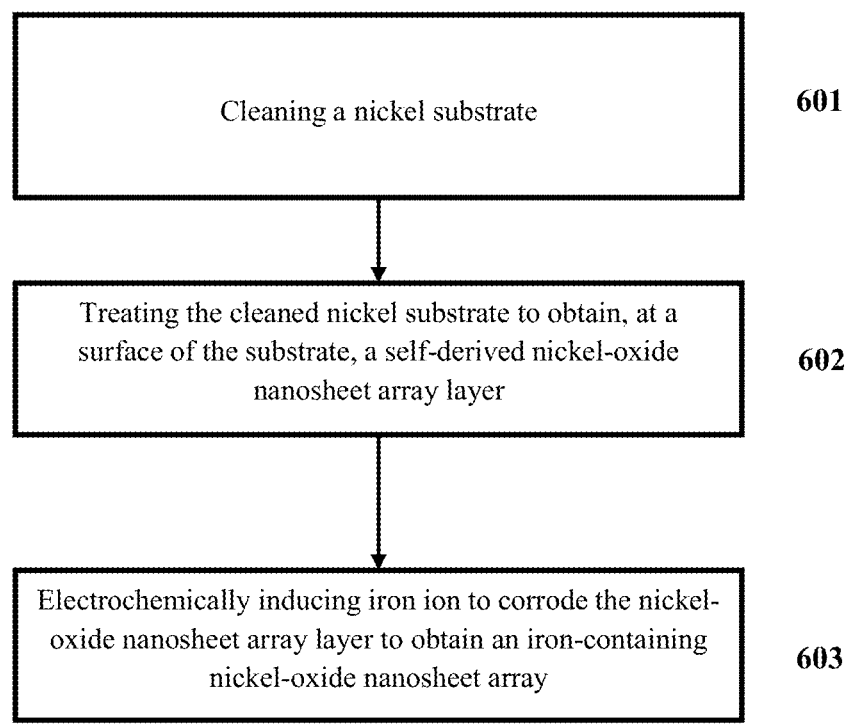
FIG. 6 is a flow chart tracing the steps of preparing a self-derivative iron-containing nickel-oxide anode.

Example for disclosed preparation method as FIG. 6:

Firstly, clean the nickel mesh (601). Prepare an untreated nickel mesh substrate, optical image is shown in FIG. 1A, SEM image is shown in FIG. 2 and indicates a smooth surface. Place it into acetone solution to ultrasonically clean for 20 minutes, then wash it with ethanol, therefore remove the grease layer on the nickel surface. For removing an oxide layer from the substrate surface, placing the substrate in hydrochloric acid solution with the concentration of 4 moles per liter, ultrasonically clean for 10 minutes; then standing in the hydrochloric acid solution for 15 minutes. Thereafter, wash the substrate with distilled water repeatedly.

Secondly, treat the cleaned nickel substrate to obtain, at a surface of the substrate, a self-derived nickel-oxide nanosheet array layer (602). Prepare the oxidant-rich alkaline solution which is comprised 500 microliter of oxidant aqueous solution with a mass fraction of 30% added to one liter of sodium hydroxide solution (6 moles per liter). Thereafter the cleaned metal nickel substrate performs the treatment in a sealed environment at a temperature of 100° C. for 6 hours. Then wash the treated substrate with distilled water repeatedly and dry.

Figure 3A:
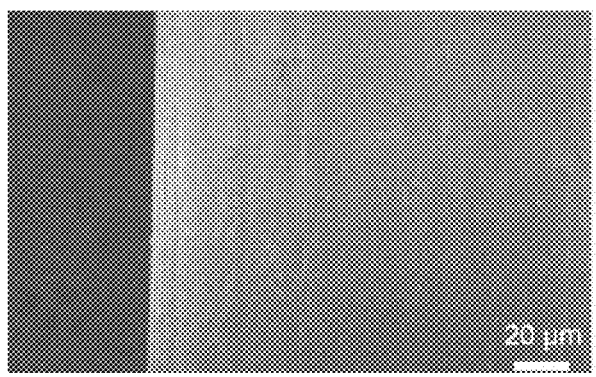
FIG. 3A, FIG. 3B and FIG. 3C are scanning electron microscope (SEM) images of the surface of the anode of FIG. 1B at various magnifications.
Figure 3B:
Figure 3C:
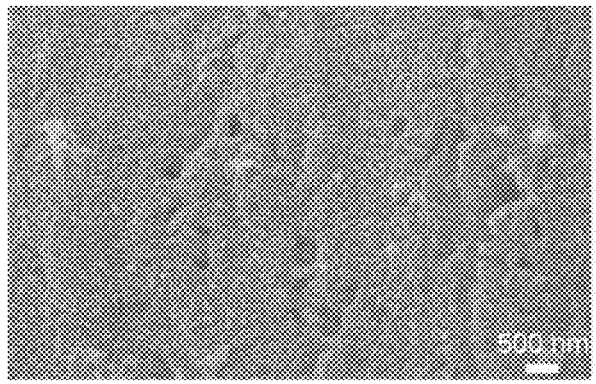
Figure 3D:
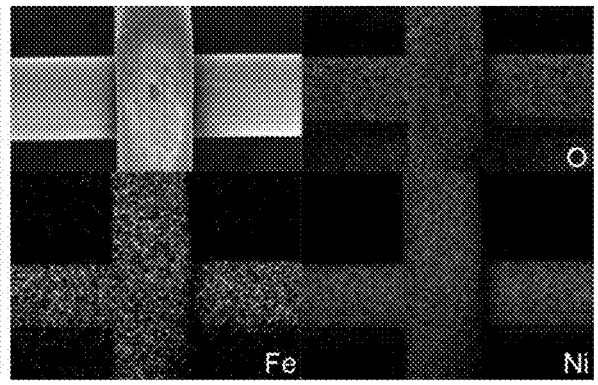
FIG. 3D is elemental map of the surface of the anode of FIG. 1B by X-ray Energy-Dispersive Spectroscopy (EDS), correspondingly.

Finally, electrochemically inducing iron ion to corrode the nickel-oxide nanosheet array layer to obtain an iron-containing nickel-oxide nanosheet array layer (603). The substrate with a self-derived nickel-oxide nanosheet array layer is performed pulsed current in a mixed solution of 0.5 mmole per liter of potassium ferricyanide and 0.5 mole per liter of sodium citrate, using the nickel substrate with the self-derived nickel-oxide nanosheet array layer as an anode and using a pure nickel plate as a cathode for 6 hours. The pulsed current uses a single-pulse current, density of 20 mA per square centimeter, time of about 10 seconds and pulse interval time of 10 seconds between the pulses to achieve electrochemical inducement of ferrous ion oxidation to iron ions, thereby corroding the self-derived nickel-oxide nanosheet array layer. Afterwards, wash it with distilled water repeatedly and dry, then a disclosed anode is obtained with significant color change, as shown in FIG. 1B. FIGS. 3A-3C show the scanning electron microscope (SEM) images of the surface of disclosed anode at various magnifications, indicate the nanosheet structure of the surface catalytic layer, and FIG. 3D shows elemental maps of Oxygen (O), Iron (Fe), and Nickel (Ni) on the surface catalytic layer of the disclosed anode (FIG. 1B) by X-ray Energy-Dispersive Spectroscopy (EDS).

The comparative example directly uses a pure nickel mesh, as shown in FIG. 1A, as an anode for water electrolysis after cleaning treatment. Place the nickel mesh into acetone solution to ultrasonically clean for 20 minutes, then washing it with ethanol, therefore remove the grease layer on the nickel surface. For removing an oxide layer from the nickel surface, placing it in hydrochloric acid solution with the concentration of 4 moles per liter, ultrasonically clean for 10 minutes; then standing in the hydrochloric acid solution for 15 minutes. Thereafter, washing the substrate with distilled water repeatedly to obtain the pure nickel mesh anode.

The self-derivative iron-containing nickel-oxide anode (FIG. 1B) and the comparative pure nickel mesh anode (FIG. 1A) are used as "sample" and "control sample" for oxygen-evolution performance test by linear voltammetry test method and chronometric potential method through three electrode system and two electrode system, correspondingly.

Figure 4:
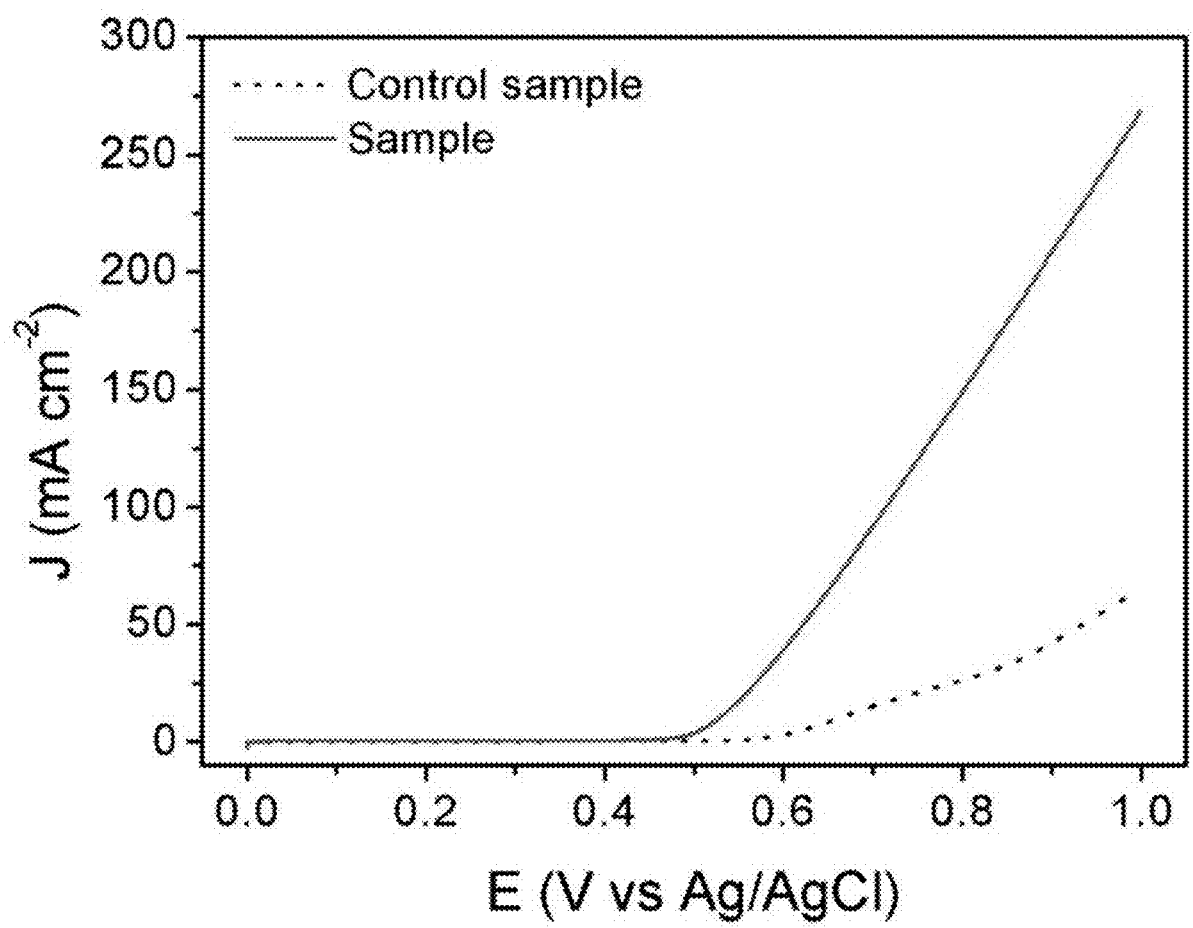
FIG. 4 is a graph showing a linear voltammetry scanning curve of water electrolysis by linear voltammetry test method through three electrode system.

By using linear voltammetry test method through a 3 electrode system, "sample" and "control sample" is used as the working electrode, a Silver/Silver Chloride electrode is used as the reference electrode, a platinum mesh is used as the auxiliary electrode. The electrolyte uses a mass of 1 mole per liter of potassium hydroxide solution. The oxygen-evolution performance is tested on an electrochemical workstation with a scanning rate of 5 millivolt per second and a scanning range of 0 to 1 volt. The test results are shown below table 1, as well as in FIG. 4, where J—Current density, mA/cm$^{-2}$ E—Potential difference, V Ag/AgCl—silver/silver chloride reference electrode filled with 3 moles per liter of potassium chloride solution

TABLE 1

Overpotentials of different test electrodes at different current densities

| Test electrode | Overpotential at different current densities (V) | | | |
|---|---|---|---|---|
| | 20 mA/cm$^{-2}$ | 50 mA/cm$^{-2}$ | 100 mA/cm$^{-2}$ | 200 mA/cm$^{-2}$ |
| Control sample | 0.543 | 0.738 | — | — |
| Sample | 0.360 | 0.426 | 0.518 | 0.689 |

Figure 5:
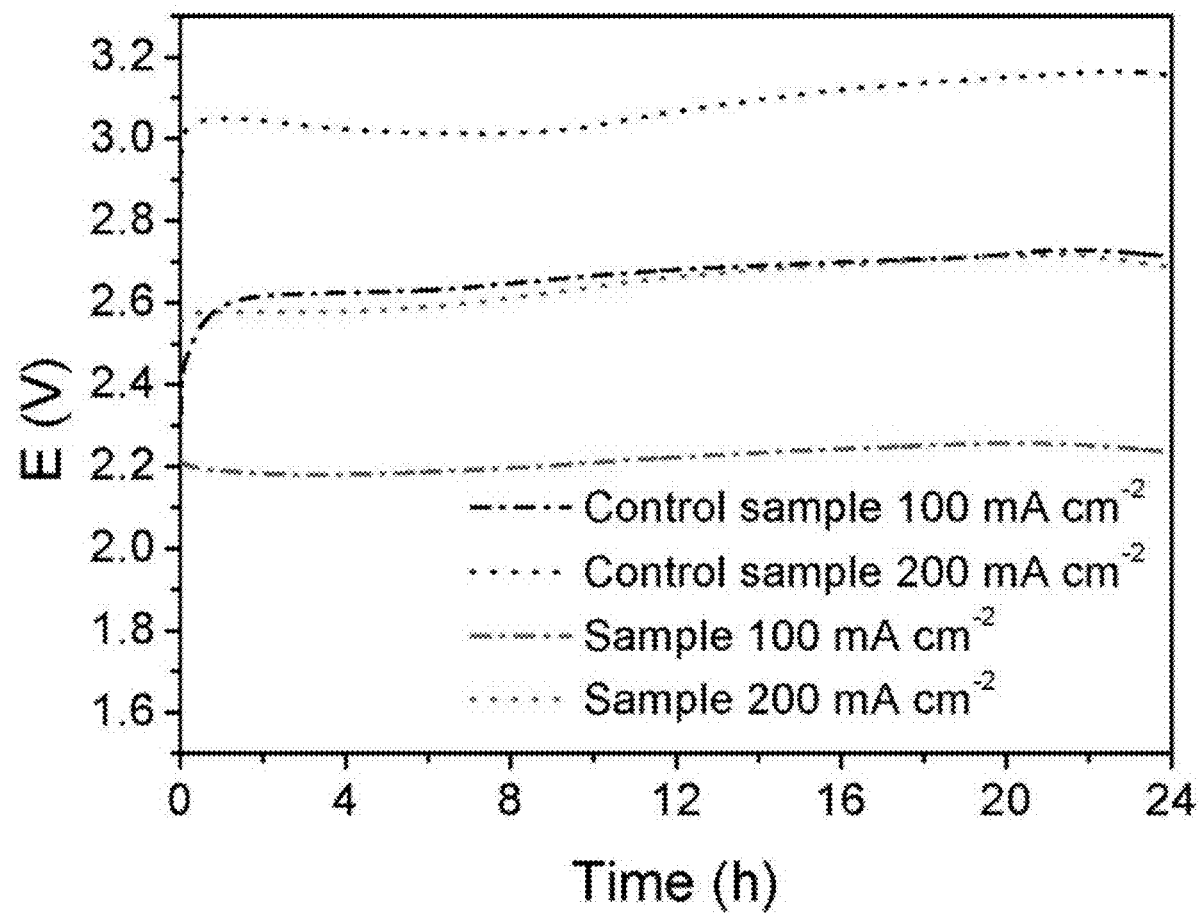
FIG. 5 is a timing potential curve of water electrolysis under different current densities by chronometric potential method through two electrode system.

By using chronometric potential method through a two electrode system, "sample" and "control sample" are used as the anodes, an industrial porous nickel mesh electrode is used as the cathode, a platinum mesh is used as the auxiliary electrode. The electrolyte uses a mass of 1 mole per liter of potassium hydroxide solution. The oxygen-evolution performance is tested on an electrochemical workstation with different current density of 100 and 200 mA per square centimeter for 24 hours. The test results are shown in FIG. 5.

From the data analysis of the two oxygen-evolution performance tests, the disclosed invented anode has significant electrocatalytic performance improvement than traditional industrial pure nickel mesh anode. Under the condition of simulation of water electrolysis in the 2 electrode system test, approximately 0.4V is reduced. Based on the traditional pure nickel anode used in industry, disclosed herein through the treatment process of oxidation reaction and electrochemically induced corrosion, form a nickel-oxide nanosheet array layer on the surface of the pure nickel anode, and thereafter successfully introduce the iron component into the layer and becoming a self-derivative iron-containing nickel anode. Various embodiments provide one or more of the following advantages:

First, the nanosheet array layer is derived from a nickel substrate. It strengthens the mechanical adhesion between the surface catalytic layer and the nickel substrate. The in-situ conversion strategy eliminates the strict phase interface between the substrate and the surface catalytic layer and improves the electron transfer. And therefore increases the catalytic durability.

Second, the nanosheet array structure increases the roughness of the surface. It can effectively increase the surface area of catalytic activity, as well as increase the site where the catalytic reaction occurs and improve the catalytic performance.

Third, the self-derivative iron-containing nickel anode for water electrolysis is based and inherited on the nanosheet array layer from oxidation reaction and electrochemically induced corrosion. It obtains an active catalytic system which has high nickel-iron oxygen-evolution.

The disclosed herein solves the technical problem of low electrocatalytic performance of traditional industrial pure nickel anode, and the issues of complex production process, high cost, difficulties of large scale production, easily falling off, etc. of high activity nickel-iron oxygen-evolution catalyst.

The above description in this specification is merely illustrative of the invention. Persons of ordinary skill in the art to which the invention pertains may make various modifications to the specific examples described, and may add, remove, or replace various components, steps, or features of these examples. Accordingly, the details provided above are not intended to limit the scope of protection.

What is claimed is:

1. A method for preparing a self-derivative iron-containing nickel anode, the method comprising sequentially:
   placing a nickel substrate in an acid solution and ultrasonically cleaning the nickel substrate in the acid solution;
   treating the cleaned nickel substrate in a sealed environment at a constant temperature of 40 to 200° C. in a mixed aqueous solution of sodium hydroxide at a concentration of 0.01 to 6 moles per liter and 100 to 600 microliter aqueous oxidant with a 30% mass fraction for 2-10 hours to obtain, at a surface of the substrate, a self-derived nickel-oxide nanosheet array layer; and
   pulse current electrochemically inducing iron ion to corrode the nickel-oxide nanosheet array layer to obtain an iron-containing nickel-oxide nanosheet array on the surface of the substrate, wherein the step of pulse current electrochemically inducing comprising performing pulsed current to intermittently treat for 2 to 12 hours by using the nickel substrate with the self-derived nickel-oxide nanosheet array layer as an anode and using a nickel plate as a cathode, to achieve electrochemical inducement of ferrous ions oxidation to ferric ions, thereby corroding the self-derived nickel-oxide nanosheet array layer with said ferric ions to obtain the iron-containing nickel-oxide nanosheet array; and
   wherein the pulsed current is a constant current for 10 seconds at a current density of 10 to 50 mA per square centimeter, and a pulse interval for another 10 seconds, repetitively.

2. The method of claim 1, wherein the oxidant comprises at least one or more of potassium permanganate, sodium permanganate, potassium hypochlorite, sodium hypochlorite, potassium chlorate, sodium chlorate, potassium perchlorate, or sodium perchlorate.

3. The method of claim 1, wherein the step of pulse current electrochemically inducing iron to corrode the nickel-oxide nanosheet array layer is performed in a mixed solution of 0.5 to 20 mmole per liter ferrous iron and 0.2 to 1 mole per liter sodium citrate.

4. The method of claim 3, wherein a ferrous iron in the mixed solution comprises at least one or more of ferrous sulfate, ammonium ferrous sulfate, potassium ferricyanide, ferrous acetate or ferrocene.

* * * * *